United States Patent
Sarkis et al.

(10) Patent No.: US 11,985,695 B2
(45) Date of Patent: May 14, 2024

(54) GENERATING COORDINATION INFORMATION FOR SIDELINK COMMUNICATIONS

(71) Applicant: QUALCOMM Incorporated, San Diego, CA (US)

(72) Inventors: Gabi Sarkis, San Diego, CA (US); Sudhir Kumar Baghel, Hillsborough, NJ (US); Kapil Gulati, Belle Mead, NJ (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/172,829

(22) Filed: Feb. 10, 2021

(65) Prior Publication Data

US 2021/0266919 A1    Aug. 26, 2021

Related U.S. Application Data

(60) Provisional application No. 62/980,392, filed on Feb. 23, 2020.

(51) Int. Cl.
   *H04W 72/56*    (2023.01)
   *H04W 76/14*    (2018.01)
   *H04W 72/542*   (2023.01)

(52) U.S. Cl.
   CPC ......... *H04W 72/56* (2023.01); *H04W 72/542* (2023.01); *H04W 76/14* (2018.02)

(58) Field of Classification Search
   CPC .... H04W 72/10; H04W 76/14; H04W 72/542
   See application file for complete search history.

(56) References Cited

U.S. PATENT DOCUMENTS

| | | | | |
|---|---|---|---|---|
| 2016/0338094 A1* | 11/2016 | Faurie | ................. | H04W 72/542 |
| 2019/0182840 A1* | 6/2019 | Feng | ................. | H04W 74/0816 |
| 2019/0306835 A1* | 10/2019 | Hoang | .............. | H04W 72/0493 |
| 2019/0394786 A1* | 12/2019 | Parron | ................ | H04L 27/0006 |
| 2021/0243749 A1* | 8/2021 | Hoang | ................ | H04W 74/085 |

FOREIGN PATENT DOCUMENTS

| | | |
|---|---|---|
| EP | 3550905 A1 | 10/2019 |
| WO | 2018027528 A1 | 2/2018 |
| WO | 2020030007 A1 | 2/2020 |

OTHER PUBLICATIONS

International Search Report and Written Opinion—PCT/US2021/017649—ISA/EPO—May 21, 2021 19 pages.

* cited by examiner

*Primary Examiner* — Won Tae C Kim
(74) *Attorney, Agent, or Firm* — The Marbury Law Group

(57) ABSTRACT

Embodiments include systems and methods for sidelink communications. In embodiments, a processor of a wireless device may determine signal strength information and priority information associated with a sidelink communication resource. The processor may determine coordination information based on the determined signal strength information and priority information. The processor may generate a message to include the determined coordination information. The processor may transmit the generated message including the determined coordination information to a second wireless device. In some embodiments, the generated message may be a control message, such as a medium access control control-element (MAC-CE) or a sidelink control information message.

25 Claims, 14 Drawing Sheets

GENERATING COORDINATION INFORMATION FOR SIDELINK COMMUNICATIONS

RELATED APPLICATIONS

This application claims the benefit of priority to U.S. Provisional Application No. 62/980,392 entitled "Generating Coordination Information for Sidelink Communications" filed Feb. 23, 2020, the entire contents of which are hereby incorporated by reference for all purposes.

BACKGROUND

In modern wireless communication technologies, such as Fifth Generation (5G) protocols, wireless devices of many different makes and classes may be configured to perform direct device-to-device communications, also called proximity services (ProSE), via a "sidelink" communication path. Sidelink communications may be conducted without the support of a communication network, referred to as Mode 2 operation. In Mode 2 operation, wireless devices must contend for communication resources (e.g., time slots and frequency channels) used for sidelink communications. Sidelink communications include logical sidelink channels for wireless devices to exchange and coordinate settings and data to control signaling and coordinate the use of the allocated frequencies. The more information a wireless device has about the availability of sidelink communication resources, the more efficiently the wireless device may perform sidelink communications.

SUMMARY

Various aspects include systems and methods for supporting sidelink communication that may be performed by a processor of a wireless device. Various aspects may include determining signal strength information and priority information associated with a sidelink communication resource, determining coordination information based on the determined signal strength information and priority information, generating a message to include the determined coordination information, and transmitting the generated message including the determined coordination information to a second wireless device.

In some aspects, determining the coordination information based on the determined signal strength information and priority information may include determining whether the sidelink communication resource is available based on one or more signal strength thresholds. Some aspects may include determining the one or more signal strength thresholds based on an indication received from the second wireless device. Some aspects may include further comprising determining the one or more signal strength thresholds based on an associated index value received from the second wireless device, wherein the one or more signal strength thresholds are configured or pre-configured on the wireless device.

In some aspects, determining the coordination information based on the determined signal strength information and priority information may include configuring the coordination information to include a signal strength measurement that is associated with the sidelink communication resource and that was performed by the wireless device. In some aspects, configuring the coordination information to include the signal strength measurement may include configuring the coordination information to include an indication of a range of signal strengths that includes the signal strength measurement.

In some aspects, determining the coordination information based on the determined signal strength information and priority information may include determining whether the sidelink communication resource is available based on priority information associated with the sidelink communication resource. In some aspects, determining whether the sidelink communication resource is available based on priority information associated with the sidelink communication resource may include determining whether the sidelink communication resource is available based on an indication of the priority information that is associated with the sidelink communication resource and is received from the second wireless device.

In some aspects, determining the coordination information based on the determined signal strength information and priority information may include determining whether the sidelink communication resource is available on a per-priority basis. In some aspects, determining the coordination information based on the determined signal strength information and priority information may include configuring the coordination information to include the determined priority information associated with the sidelink communication resource. In some aspects, generating the message may include generating a medium access control control-element (MAC-CE). In some aspects, generating the message may include generating a sidelink control information message.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
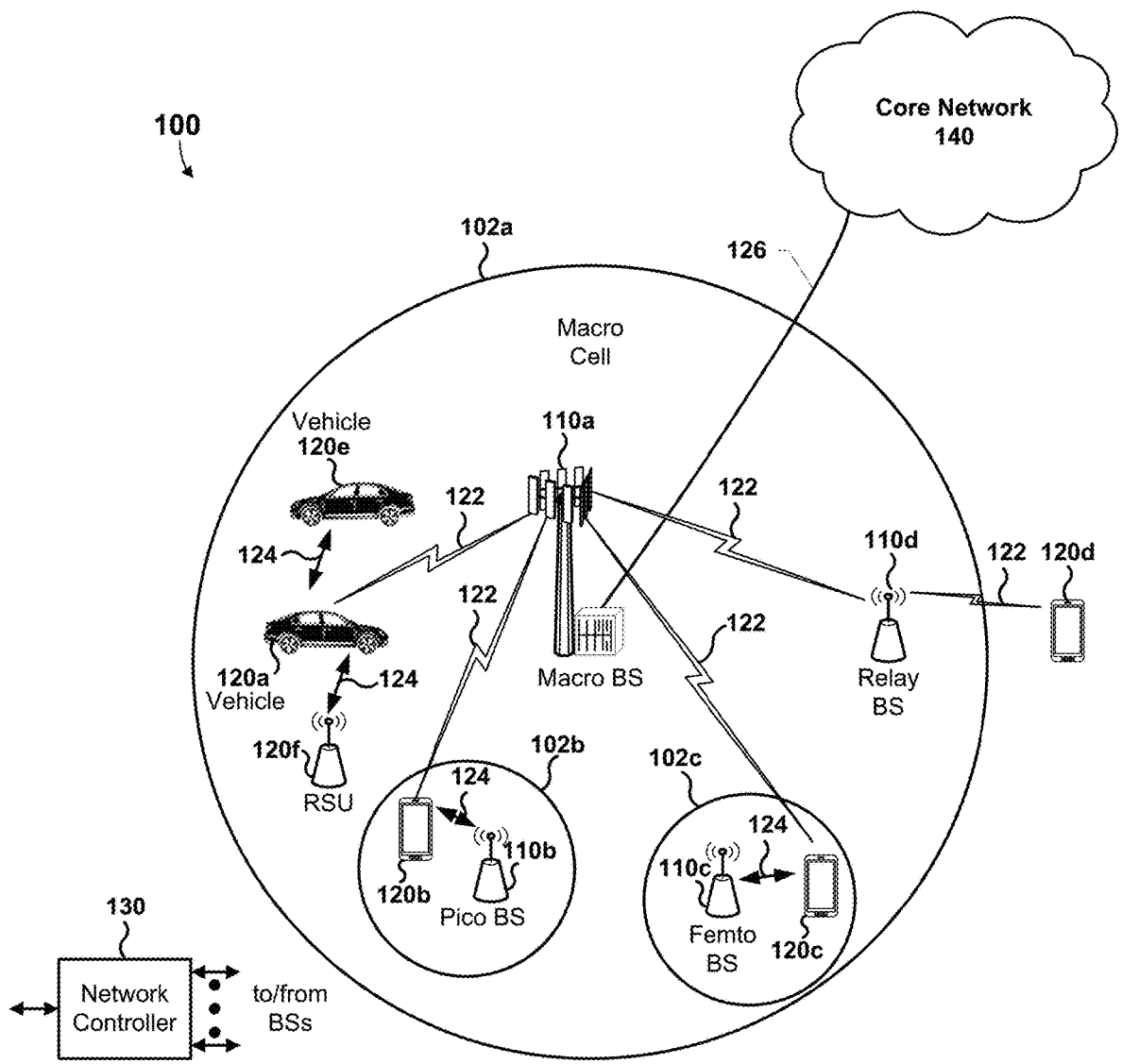
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for supporting sidelink communications between two or more wireless devices including a first wireless device determining signal strength information and priority information associated with a sidelink communication resource, and transmitting such information so that a second wireless device can reserve sidelink communication resources with reduced potential for communication collisions in sidelink messages received by the first wireless device.

The term "wireless device" is used herein to refer to any one or all of cellular telephones, smartphones, wireless communication elements within autonomous and semiautonomous vehicles, intelligent highway computing devices including road side units, highway sensors, portable computing devices, laptop computers, tablet computers, multimedia Internet-enabled cellular telephones, medical devices and equipment, biometric sensors/devices, wearable devices, wireless-network enabled Internet of Things (IoT) devices including smart meters/sensors, industrial manufacturing equipment, large and small machinery and appliances for home or enterprise use, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Allocation of sidelink communication resources (i.e., time slots and frequency channels) used to transmit sidelink messages is reservation-based. Sidelink resources may be allocated in units of sub-channels in the frequency domain, and may be limited to one slot in the time domain. A wireless device may transmit a reservation message to reserve resources in a current time slot and in up to two future time slots. Wireless devices transmit reservation messages in sidelink control information (SCI) messages. Sidelink communication reservations may be made in a window of a designated number of logical slots (such as 32 logical slots). Various systems may support aperiodic and periodic reservations. A period may be signaled in the SCI, and may be of a configurable duration (e.g., 0 ms-1000 ms). Such periodic resource reservations and signaling may also be disabled in the communication network.

In Mode 2 operations, a wireless device may identify candidate resources by detecting the presence and measuring the strength of a wireless signal, excluding occupied resources (i.e., subchannels in which wireless signals are detected with a strength exceeding a threshold), and selecting candidate resource from available resources (i.e., sideline communication resources that have not been reserved by another wireless device). Conventionally, a wireless device may decode SCI to determine whether a resource is available or has been reserved. The wireless device may reserve an un-reserved resource. To identify sidelink communication resources that are not occupied, a wireless device may measure a signal strength (such as a Reference Signal Receive Power) for reservations in decoded SCI information. The signal strength of the transmission associated with an SCI reserving resources may be projected onto the resource selection window. Resource reservations are also associated with a priority, and a reservation may be pre-empted by a higher-priority reservation, which may trigger the resource selection process again.

A sidelink communication resource collision occurs when two or more wireless devices select or contend for the same communication resources. The process of identifying available sidelink communication resources and reserving resources prior to transmitting a sidelink message is designed to avoid collisions. However, the information available to wireless devices for identifying unoccupied sidelink resources is limited to received signals and measurements. Conventionally, a wireless device is able to determine whether sidelink communication resources are available nearby; however, the wireless device is unable to make that determination at the location of another wireless device. Thus, it is possible that a wireless device may reserve sidelink communication resources and then transmit a message or transmission that collides at a receiving wireless device with messages or transmissions from other devices. The more information a wireless device has about the availability of sidelink communication resources, the more efficiently the wireless device may identify and use available sidelink communication resources that will not collide with other transmissions at receiving wireless devices.

Various embodiments enable improved performance of sidelink communications by a first wireless device providing to a second wireless device information regarding available sidelink communication resources observed by the first wireless device. In various embodiments, the first wireless device may determine signal strength information and priority information associated with a sidelink communication resource, and may generate a message (which may be a control message such as a control channel message, a Physical Sidelink Control Channel (PSCCH) message, or another suitable message) to include a variety of information to enable a second wireless device to avoid a sidelink communication resource collision (referred to herein as "coordination information"). The wireless device may then transmit the generated message including the coordination information to the second wireless device. For example, the wireless device may determine that a signal is present in a communication resource, may determine a signal strength, may receive reservation information, or may determine a priority associated with reservation information, from one or more other wireless devices, as well as a variety of other information. The wireless device may encode some or all of such information in a message, which may be a control message, and transmit the message to a second wireless device. The second wireless device may use the information thus provided to select an available sidelink communication resource.

In some embodiments, the wireless device may determine whether the sidelink communication resource is available based on one or more signal strength thresholds (such as a Reference Signal Receive Power (RSRP)). In some embodiments, the wireless device may determine that a sidelink communication resource is available if a signal strength associated with a signal associated with the sidelink communication resource is below the signal strength threshold. In some embodiments, the wireless device may determine that a sidelink communication resource is not available if the signal strength associated with a signal associated with the sidelink communication resource is above the signal strength threshold. In some embodiments, the signal strength threshold may be the same as a signal strength threshold used by the wireless device for sidelink communication resource selection. In some embodiments, the signal strength threshold may be different from the signal strength threshold used by the wireless device for sidelink communication resource selection. In some embodiments, the wireless device may use one or more signal strength thresholds. In some embodiments, the signal strength threshold(s) may be configurable, such as by another wireless device. In some embodiments, signal strength threshold(s) may be pre-configured on the wireless device, such as stored in memory and associated with an index value, and the other wireless device may indicate one or more signal strength thresholds to use by forwarding an index value corresponding to (or associated with) an appropriate signal strength thresholds(s).

In some embodiments, the wireless device may determine whether the sidelink communication resource is available based on one or more signal strength thresholds indicated by the second wireless device. In some embodiments, the second wireless device may indicate the one or more signal strength thresholds in a message transmitted in an SCI message (such as an SCI 2 message), a media access control-control element (MAC-CE), or in a PC5 interface-RRC (radio resource control) message. In some embodiments, the message may include a value or values, such as one or more indices, that the wireless device may use to obtain the one or more signal strength thresholds (e.g., from a data structure in a memory of the wireless device). In some embodiments, the message from the second wireless device may include an offset that the wireless device may apply to the one or more signal strength thresholds. In some embodiments, the wireless device may apply the offset to approximate a signal strength (e.g., RSRP) as if the signal were received by the second wireless device instead of the wireless device. The wireless device may use such an approximated signal strength to determine whether a sidelink communication resource is available.

In some embodiments, the wireless device may configure the coordination information to include a signal strength measurement that is associated with the sidelink communication resource and that was performed by the wireless device. In some embodiments, the wireless device may configure the coordination information to include an indication of a range of signal strengths that comprises the signal strength measurement. In some embodiments, configuring coordination information may include generating a message that includes the coordination information. In some embodiments, configuring coordination information may include incorporating the coordination information into a message, such as an existing message. For example, a wireless device may generate a message, which may be control message or another suitable message, that includes the coordination information.

In some embodiments, the wireless device may determine whether the sidelink communication resource is available based on priority information associated with the sidelink communication resource. In some embodiments, the wireless device may determine whether the sidelink communication resource is available based on priority information indicated by the second wireless device and associated with the sidelink communication resource. In some embodiments, the second wireless device may indicate the priority information using an SCI message (such as an SCI 2 message), an MAC-CE, or a PC5-RRC message. In some embodiments, the wireless device may determine whether the sidelink communication resource is available on a per-priority basis. In some embodiments, the wireless device may configure the coordination information to include the determined priority information associated with the reservation of the sidelink communication resource.

FIG. 1 is a system block diagram illustrating an example communication system 100 suitable for implementing any of the various embodiments. The communications system 100 may be a 5G New Radio (NR) network, or any other suitable network such as Long Term Evolution (LTE) network.

The communications system 100 may include a heterogeneous network architecture that includes a core network 140 and a variety of wireless devices (illustrated as vehicles 120a and 120e, a road side unit 120f, and mobile devices 120b-120d, all referred to herein generally as "wireless devices"). The communications system 100 may also include a number of base stations (illustrated as the BS 110a, the BS 110*b*, the BS 110*c*, and the BS 110*d*) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110*a*-110*d* may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110*a* may be a macro BS for a macro cell 102*a*, a base station 110*b* may be a pico BS for a pico cell 102*b*, and a base station 110*c* may be a femto BS for a femto cell 102*c*. A base station 110*a*-110*d* may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network The base station 110*a*-110*d* may communicate with the core network 140 over a wired or wireless communication link 126. The wireless device 120*a*-120*f* may communicate with the base station 110*a*-110*d* over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110*d*). A relay station is an entity that can receive a transmission of data from an upstream station (for example, a base station or a wireless device) and transmit the data to a downstream station (for example, a wireless device or a base station). A relay station also may be a wireless device that can relay transmissions for other wireless devices. In the example illustrated in FIG. 1, a relay station 110*d* may communicate with macro the base station 110*a* and the wireless device 120*d* in order to facilitate communications between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*-120*f* may be dispersed throughout communications system 100, and each wireless device may be stationary (e.g., a road side unit 120*f*) or mobile (e.g., vehicles 120*a*, 120*e*).

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communications (MTC) or evolved or enhanced machine-type communications (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband Internet of things) devices. A wireless device 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more wireless devices 120a-120f (for example, illustrated as a first vehicle wireless device 120a, a second vehicle the wireless device 120e, and a road side unit (RSU) 120f) may communicate directly using one or more sidelink channels 124. Sidelink channels 124 enable communications without using a base station 110 as an intermediary to communicate with one another. For example, the wireless devices 120a-120f may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, processors in the wireless device 120a-120f may perform scheduling operations, resource selection operations, as well as other operations described elsewhere herein as being performed by the base station 110a.

Figure 1B:
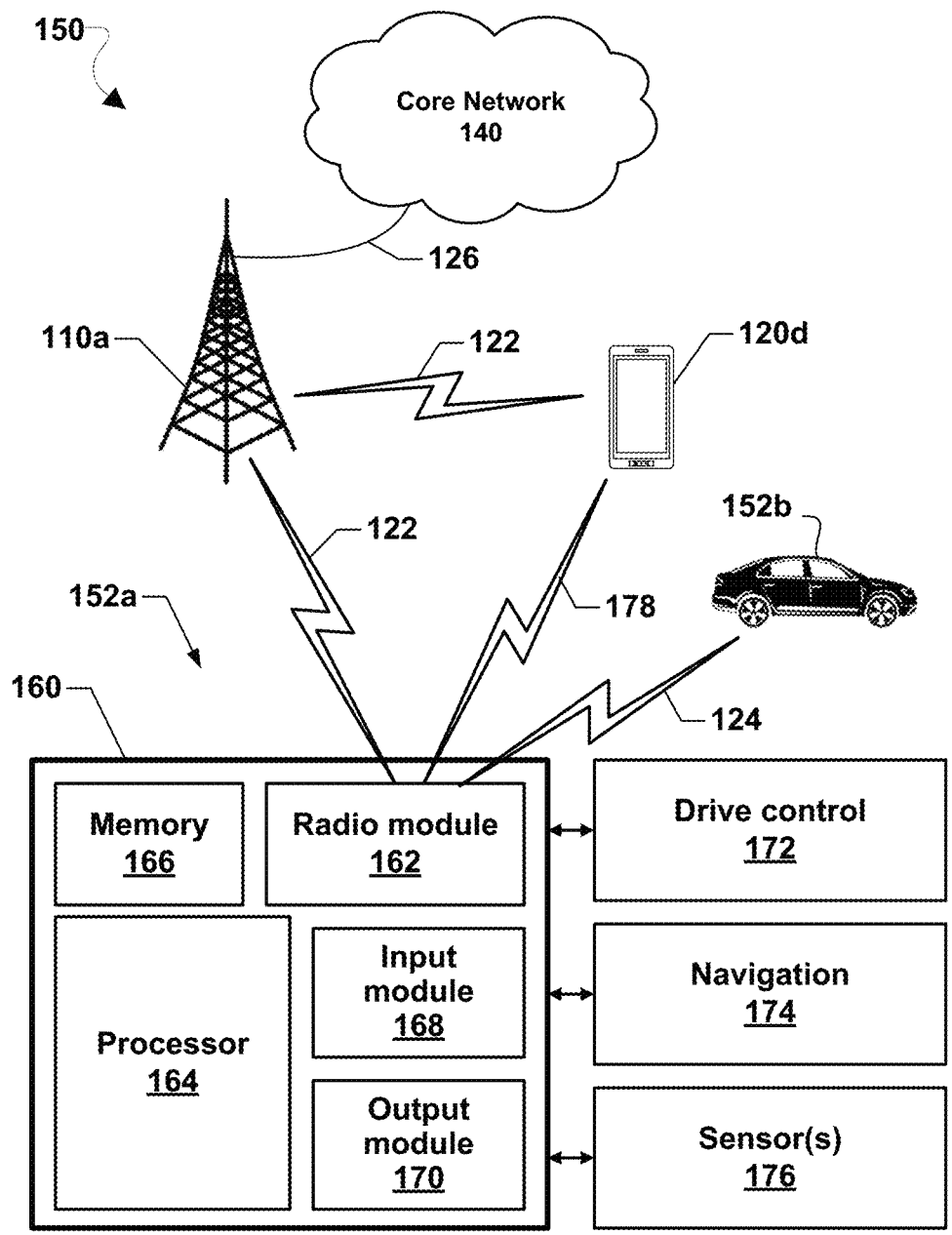
FIG. 1B is a system and component block diagram illustrating a system of components and support systems suitable for implementing various embodiments.

FIG. 1B is a system and component block diagram illustrating a system 150 of components and support systems suitable for implementing various embodiments. With reference to FIGS. 1A and 1B, a vehicle 152a may include a control unit 160, which may include various circuits and devices used to control the operation of the vehicle 100 as well as communicate with other vehicles that are similarly equipped. In the example illustrated in FIG. 1B, the control unit 160 includes a radio module 162, a processor 164, memory 166, an input module 168, and an output module 170. The control unit 160 may be coupled to and configured to control drive control components 172, navigation components 174, and one or more sensors 176 of the vehicle 152a.

The control unit 160 may include a processor 164 that may be configured with processor-executable instructions to control maneuvering, navigation, and/or other operations of the vehicle 152a, including operations of various embodiments. The processor 164 may be coupled to the memory 166. The control unit 162 may include the input module 168, the output module 170, and the radio module 162.

The radio module 162 may be configured for wireless communications, including implementing operations of various embodiments. The radio module 162 may exchange wireless signals 122 with a base station and sidelink communication messages 124 with control units in other vehicles 152b and road side units 120f In some embodiments, the radio module 162 may also enable the vehicle 152a (e.g., an infotainment system) to communicate with a wireless communication device 120d through a bidirectional wireless communication link 178, such as a Bluetooth wireless data link.

The input module 168 may receive sensor data from one or more vehicle sensors 176 as well as electronic signals from other components, including the drive control components 172 and the navigation components 174. The output module 170 may be used to communicate with or activate various components of the vehicle 152a, including the drive control components 172, the navigation components 174, and the sensor(s) 176.

The control unit 160 may be coupled to the drive control components 172 to control physical elements of the vehicle 152a related to maneuvering and navigation of the vehicle, such as the engine, motors, throttles, steering elements, flight control elements, braking or deceleration elements, and the like.

The control unit 160 may be coupled to the navigation components 174, and may receive data from the navigation components 174 and be configured to use such data to determine the present position and orientation of the vehicle 152a, as well as an appropriate course toward a destination.

The processor 164 and/or the navigation components 174 may be configured to communicate with a core network 140 (e.g., the Internet) using a wireless connection 122 with a cellular data network base station 110a. The processor 164 may also be configured to perform a variety of software application programs by executing processor-executable instructions in an application layer as described herein.

While the control unit 160 is described as including separate components, in some embodiments some or all of the components (e.g., the processor 164, the memory 166, the input module 168, the output module 170, and the radio module 162) may be integrated in a single device or module, such as a system-on-chip (SOC) or system-in-package (SIP) processing device, such as described with reference to FIG. 2. Such an SOC or SIP processing device may be configured for use in vehicles and be configured, such as with processor-executable instructions executing in the processor 164, to perform operations of various embodiments when installed into a vehicle.

In some implementations, the communication system 100 may include one or more devices configured to communicate as part of an intelligent transportation system (ITS). ITS technologies may increase intercommunication and safety for driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines transmission modes that provide non-line-of-sight awareness and a higher level of predictability for enhanced road safety and autonomous driving. Such C-V2X transmission modes may include V2V, V2I, and V2P, and may utilize frequencies in a 5.9 gigahertz (GHz) spectrum that is independent of a cellular network. C-V2X transmission modes may also include vehicle-to-network communications (V2N) in mobile broadband systems and technologies, such as 3G mobile communication technologies (e.g., GSM evolution (EDGE) systems, CDMA 2000 systems, etc.), 4G communication technologies (e.g., LTE, LTE-Advanced, WiMAX, etc.), as well as 5G systems.

Figure 2:
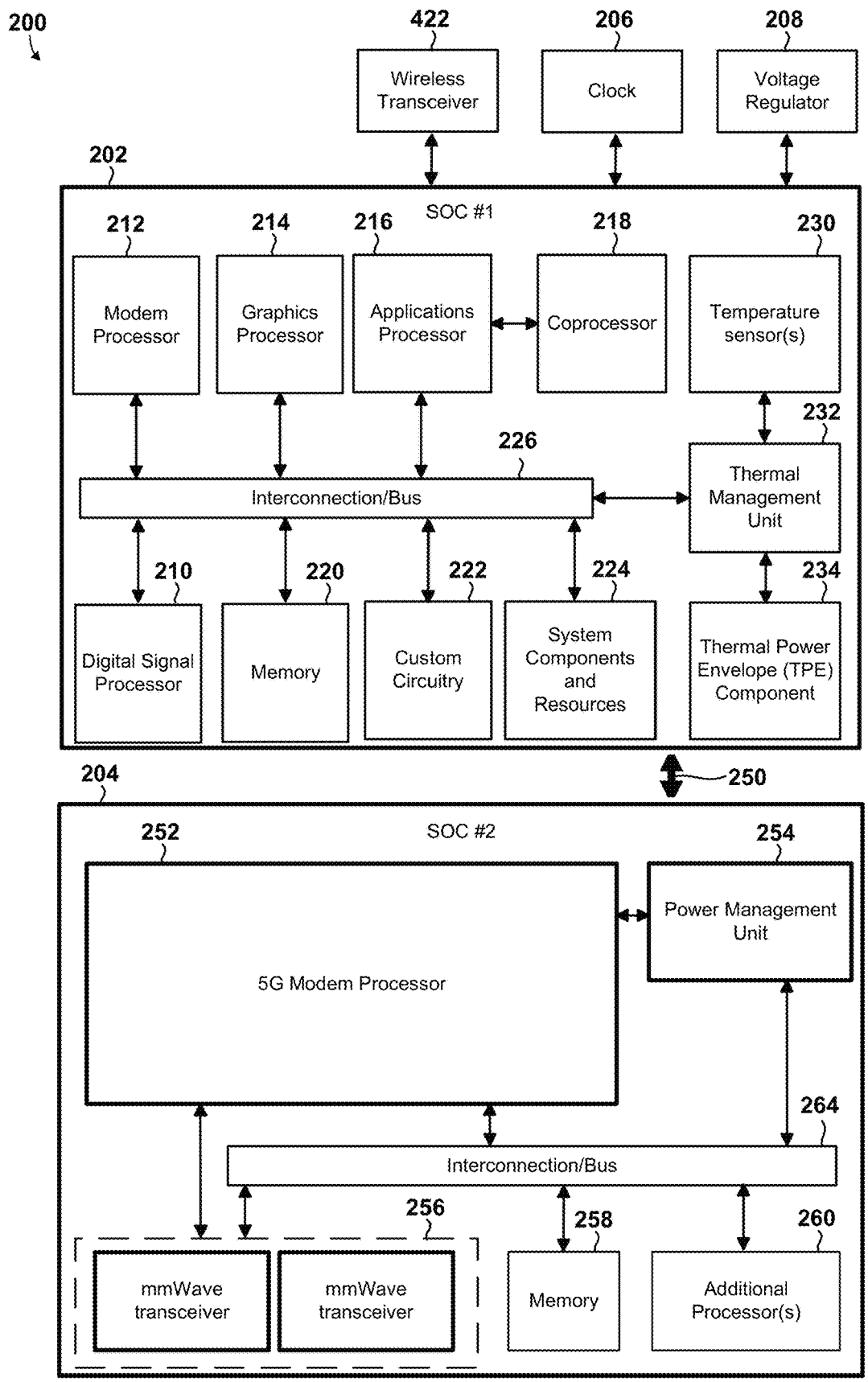
FIG. 2 is a component block diagram illustrating an example computing and wireless modem system suitable for implementing any of the various embodiments.

FIG. 2 is a component block diagram illustrating an example computing system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example SIP 200 includes a two SOCs 202, 204 coupled to a clock 206, a voltage regulator 208 and a wireless transceiver 422. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
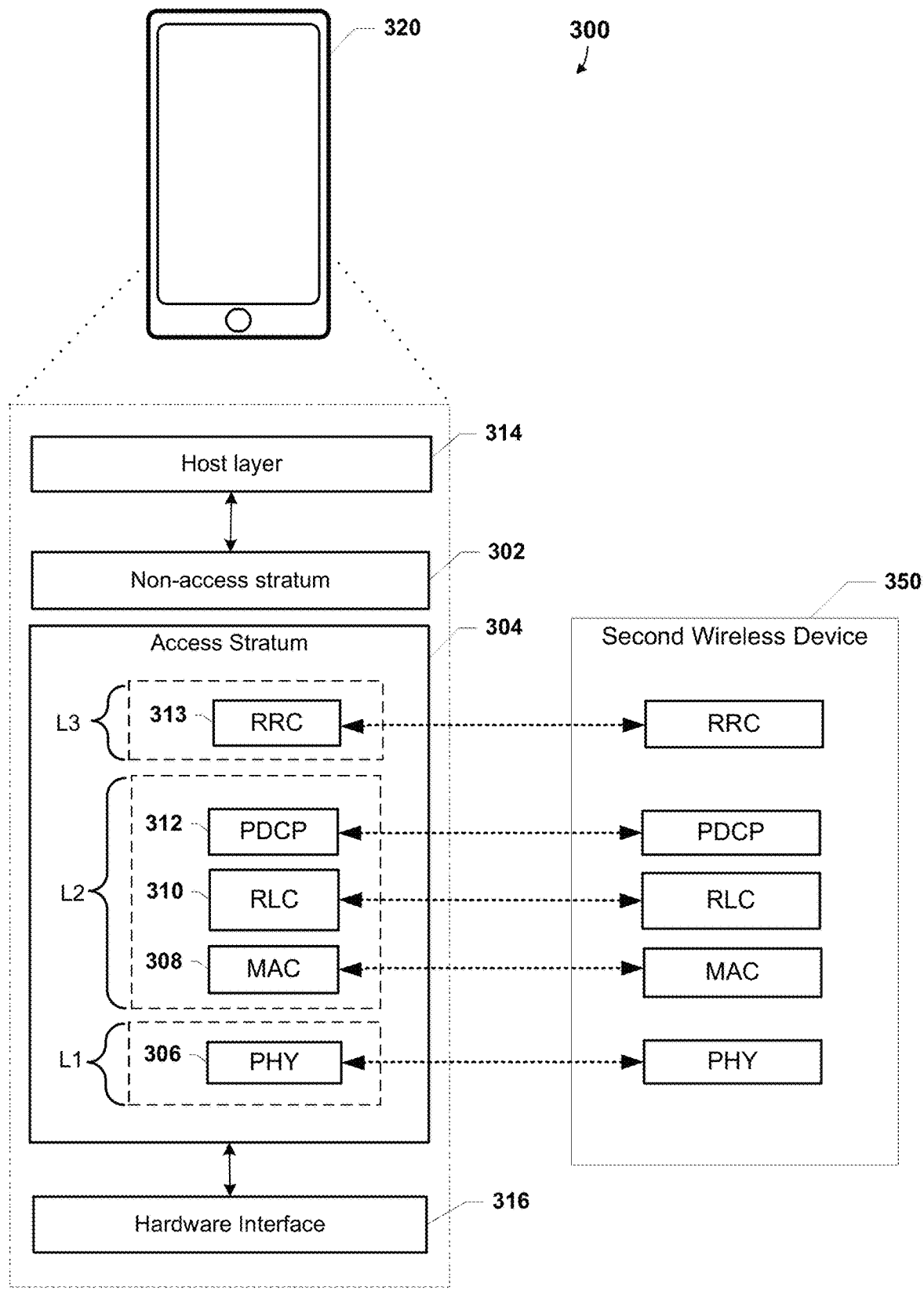
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communications between the wireless device 320 (e.g., the wireless device 120a-120f, 200) and a second wireless device 350 (e.g., a vehicle wireless device 120d, a road side unit 120f, a base station 110a, etc.) of a communication system (e.g., 100). In various embodiments, layers in the software architecture 300 may form logical connections with corresponding layers in software of the second wireless device 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communications between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including a Physical Downlink Control Channel (PDCCH) and a Physical Downlink Shared Channel (PDSCH), or sidelink channels such as a Physical Sidelink Control Channel (PSCCH) and a Physical Sidelink Shared Channel (PSSCH).

In the user and control planes, Layer 2 (L2) of the AS 304 may be responsible for the link between the wireless device 320 and the second wireless device 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the second wireless device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the second wireless device 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
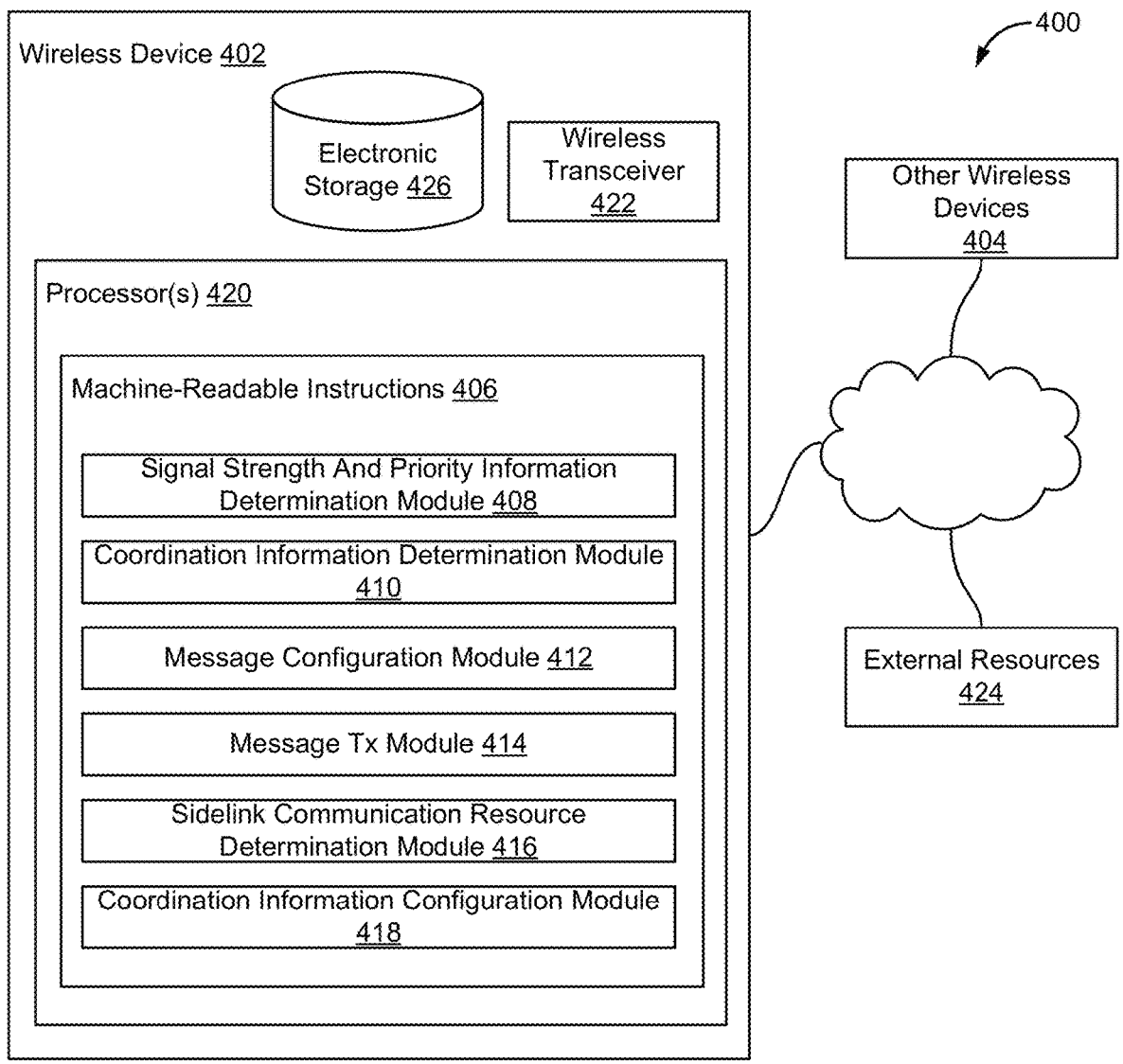
FIG. 4 is a component block diagram illustrating a system configured for sidelink communications in accordance with various embodiments.

FIG. 4 is a component block diagram illustrating a system 400 configured for sidelink communications in accordance with various embodiments. In some embodiments, system 400 may include a wireless device 402 and/or one or more other wireless devices 404. With reference to FIGS. 1-4, examples of the wireless device 402 may include the wireless device 120a-120f, 200, 320). Other wireless device(s) 404 may include a road side unit (RSU) or other wireless devices (e.g., the wireless device 120a-120f, 200, 320). The external resources 424 may include sources of information outside of the system 400, external entities participating with the system 400, and/or other resources. In some implementations, some or all of the functionality attributed herein to external resources 424 may be provided by resources included in the system 400.

Wireless device 402 may include a processor 420 coupled to a wireless transceiver 422 and configured by machine-readable instructions 406. Machine-readable instructions 406 may include one or more instruction modules. The instruction modules may include one or more of a signal strength and priority information determination module 408, a coordination information determination module 410, a message configuration module 412, a message transmission (Tx) module 414, a sidelink communication resource determination module 416, a coordination information configuration module 418, and/or other instruction modules.

The signal strength and priority information determination module 408 may be configured to determine signal strength information and priority information associated with a sidelink communication resource.

The coordination information determination module 410 may be configured to determine coordination information based on the determined signal strength information and priority information. In some embodiments, determining coordination information based on the determined signal strength information and priority information may include determining whether the sidelink communication resource is available based on priority information associated with the sidelink communication resource. In some embodiments, determining coordination information based on the determined signal strength information and priority information may include determining whether the sidelink communication resource is available based on priority information indicated by the second wireless device and associated with the sidelink communication resource. In some embodiments, determining coordination information based on the determined signal strength information and priority information may include determining whether the sidelink communication resource is available on a per-priority basis. In some embodiments, determining the coordination information based on the determined signal strength information and priority information may include configuring the coordination information to include the determined priority information associated with the reservation of the sidelink communication resource.

The message configuration module 412 may be configured to configure a message to include the determined coordination information. In some embodiments, the message configuration module 412 may be configured to configure a control message, such as a control channel message, a PSCCH message, MAC-CE, or another suitable control message.

The message transmission (Tx) module 414 may be configured to transmit the configured message including the determined coordination information to the second wireless device.

The sidelink communication resource determination module 416 may be configured to determine whether the sidelink communication resource is available based on one or more signal strength thresholds. The sidelink communication resource determination module 416 may be configured to determine whether the sidelink communication resource is available based on one or more signal strength thresholds indicated by the second wireless device.

The coordination information configuration module 418 may be configured to configure the coordination information to include a signal strength measurement that is associated with the sidelink communication resource and that was performed by the wireless device. In some embodiments, configuring the coordination information to include a signal strength measurement that may be associated with the sidelink communication resource may include configuring the coordination information to include an indication of a range of signal strengths that includes the signal strength measurement.

The other wireless devices 404 may include one or more processors configured to execute computer program modules similar to the first wireless device 402 as described.

Processor(s) 420 may be configured to provide information processing capabilities in the wireless device 402. As such, the processor(s) 420 may include one or more of a digital processor, an analog processor, a digital circuit designed to process information, an analog circuit designed to process information, a state machine, and/or other mechanisms for electronically processing information. Although the processor(s) 420 is shown in FIG. 4 as a single entity, this is for illustrative purposes only. In some implementations, the processor(s) 420 may include a plurality of processing units and/or processor cores. The processing units may be physically located within the same device, or processor(s) 420 may represent processing functionality of a plurality of devices operating in coordination. The processor(s) 420 may be configured to execute modules 408-418 and/or other modules by software; hardware; firmware; some combination of software, hardware, and/or firmware; and/or other mechanisms for configuring processing capabilities on processor(s) 420. As used herein, the term "module" may refer to any component or set of components that perform the functionality attributed to the module. This may include one or more physical processors during execution of processor readable instructions, the processor readable instructions, circuitry, hardware, storage media, or any other components.

Figure 5:
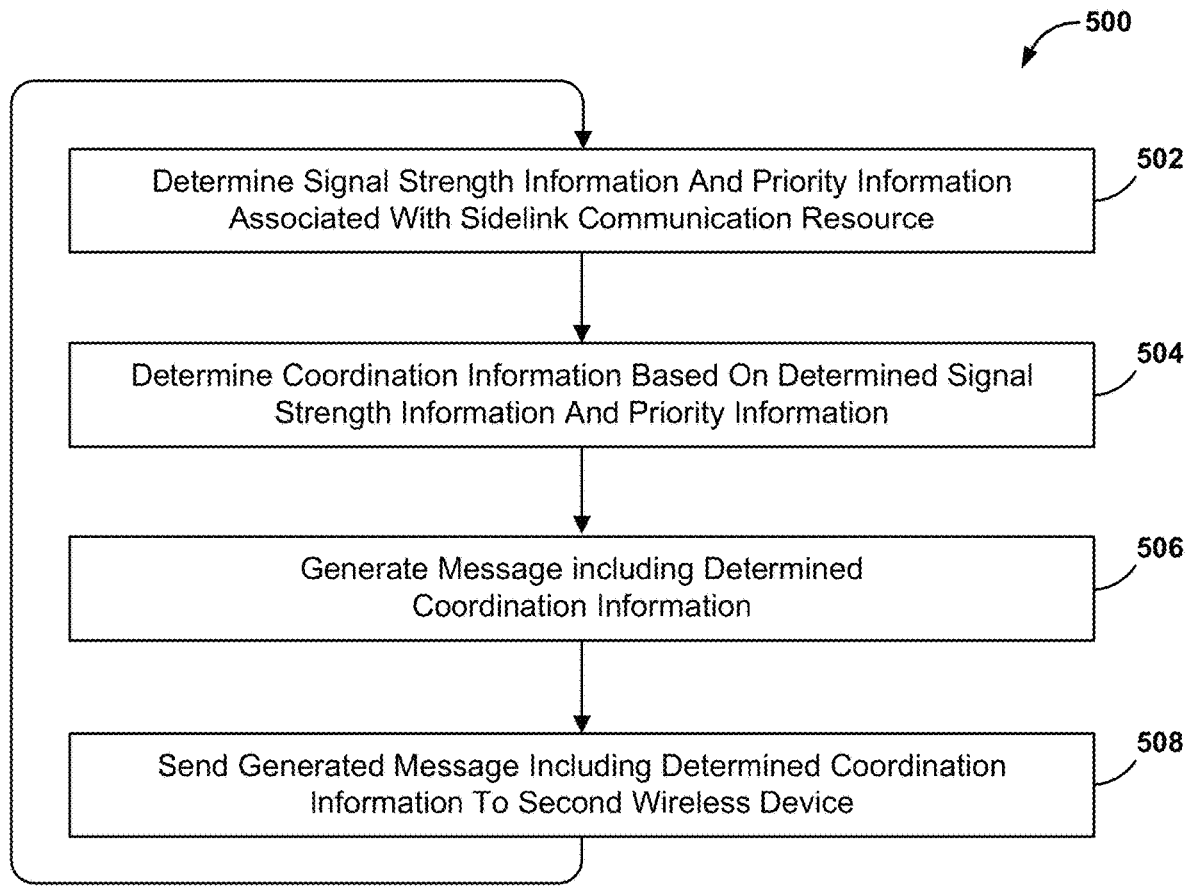
FIG. 5 is a process flow diagram illustrating a method of sidelink communications according to various embodiments.

FIG. 5 is a process flow diagram illustrating a method of sidelink communications according to various embodiments. With reference to FIGS. 1-5, the operations of the method 500 may be performed by a processor of a wireless device for exchanging information for supporting sidelink communications to enable preventing or minimizing collisions on communication resources. The operations of the method 500 may be performed by a processor (such as the processor 164, 210, 212, 214, 216, 218, 252, 260, 420) coupled to a wireless transceiver (e.g., 422) of a wireless device (such as the wireless device 120a-120f, 200, 320, 350, 402). For example, the operations of the method 500 may be performed by a processor of a road side unit (e.g., the road side unit 102f), vehicles (e.g., 102d and/or another wireless device (e.g., the wireless device 120a-120f, 200, 320) performing side link communications (e.g., V2X).

In block 502, the processor may determine signal strength information and priority information associated with a sidelink communication resource. For example, the processor may measure the Reference Signal Receive Power (RSRP). Means for performing functions of the operations in block 502 may include the processor (e.g., 164, 210, 212, 214, 216, 218, 252, 260, 420) and/or in conjunction with a wireless transceiver (e.g., 422) that may make power measurements in some embodiments to provide coordination information.

In block 504, the processor may determine coordination information based on the determined signal strength information and priority information. Means for performing functions of the operations in block 504 may include the processor (e.g., 164, 210, 212, 214, 216, 218, 252, 260, 420).

In block 506, the processor may generate a message to include the determined coordination information. In some embodiments, the processor may configure the generated the message to include the determined coordination information. In some embodiments, generating the message in block 506 may include generating a control message, such as a medium access control control-element (MAC-CE). In some embodiments, generating the message in block 506 may include generating a sidelink control information message. Means for performing functions of the operations in block 506 may include the processor (e.g., 164, 210, 212, 214, 216, 218, 252, 260, 420).

In block 508, the processor may transmit the generated channel information including the determined coordination information to the second wireless device. Means for performing functions of the operations in block 508 may include the processor (e.g., 164, 210, 212, 214, 216, 218, 252, 260, 420) and the wireless transceiver (e.g., 422) that transmits the channel information.

The processor may again perform the operations of block 502 as described.

FIGS. 6A, 6B, 6C, 6D, 6E, and 6F are process flow diagrams illustrating operations 600a-600c that may be performed by a processor of a wireless device as part of a method of sidelink communications according to various embodiments. With reference to FIGS. 1-6C, the operations 600a-600f may be performed by a processor (such as the processor 164, 210, 212, 214, 216, 218, 252, 260, 420) of a wireless device (such as the wireless device 120a-120e, 200, 320, 402). In some embodiments the operations 600a-600c may be performed by a processor of a road side unit (e.g., the road side unit 102f), vehicles (e.g., 102a, 102e, 152a, 152b) and/or another wireless device (e.g., the wireless device 120a-120f, 200, 320) performing side link communications (e.g., V2X).

Figure 6A:
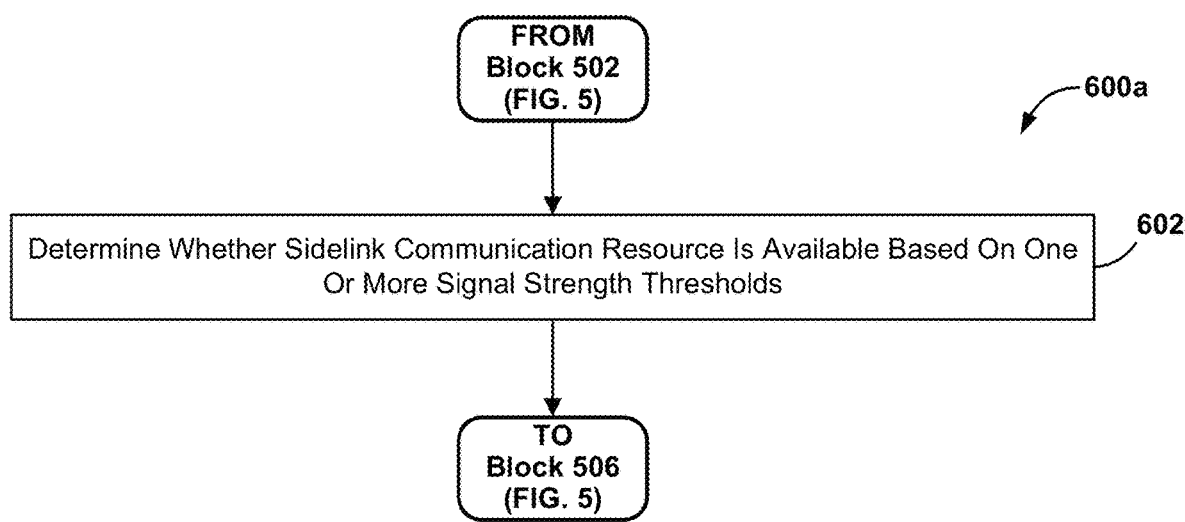
FIGS. 6A, 6B, 6C, 6D, 6E, and 6F are process flow diagrams illustrating operations that may be performed by a processor of a wireless device as part of a method of sidelink communications according to various embodiments.

Referring to FIG. 6A, following the operations of block 502 (FIG. 5), the processor may determine whether the sidelink communication resource is available based on one or more signal strength thresholds in block 602.

In some embodiments, the one or more signal strength thresholds may be based on one or more RSRP values. In some embodiments, the processor may determine that a sidelink communication resource is available if a signal strength associated with a signal associated with the sidelink communication resource is below the signal strength threshold. In some embodiments, the processor may determine that a sidelink communication resource is not available if the signal strength associated with a signal associated with the sidelink communication resource is above the signal strength threshold. In some embodiments, the signal strength threshold may be the same as a signal strength threshold used by the wireless device for sidelink communication resource selection. In some embodiments, the signal strength threshold may be different from the signal strength threshold used by the wireless device for sidelink communication resource selection. Means for performing functions of the operations in block 602 include the processor (e.g., 164, 210, 212, 214, 216, 218, 252, 260, 420).

The processor may then perform the operations of block 506 as described with reference to FIG. 5.

Figure 6B:
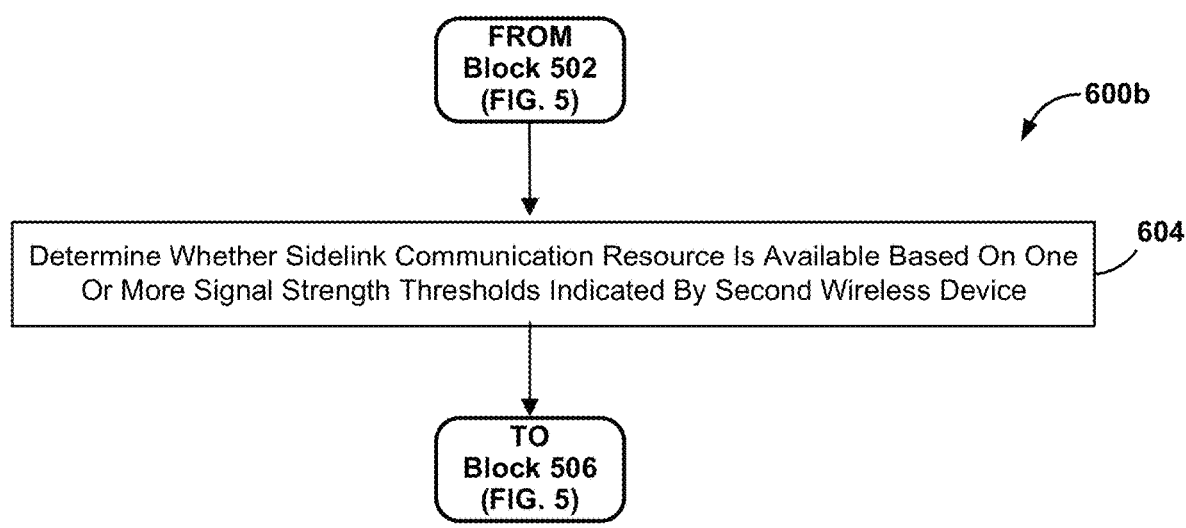

Referring to FIG. 6B, following the operations of block 502 (FIG. 5), the processor may determine whether the sidelink communication resource is available based on one or more signal strength thresholds indicated by the second wireless device in block 604. In some embodiments, the second wireless device may transmit an indication to the wireless device (i.e., the first wireless device) of one or more signal strength thresholds, and the wireless device may determine the one or more signal strength thresholds based on the indication from the second wireless device. In some embodiments, the second wireless device may transmit the indication in a message included in an SCI message (e.g., an SCI 2 message), a MAC-CE, or in a PC5-RRC (radio resource control) message. In some embodiments, the message may include a value or values, such as one or more indices (e.g., an index value or index values), that the wireless device may use to obtain the one or more signal strength thresholds (e.g., from a data structure in a memory of the wireless device). In some embodiments, the message from the second wireless device may include an offset that the wireless device may apply to the one or more signal strength thresholds. Means for performing functions of the operations in block 604 include the processor (e.g., 164, 210, 212, 214, 216, 218, 252, 260, 420).

The processor may then perform the operations of block 506 as described with reference to FIG. 5.

Figure 6C:
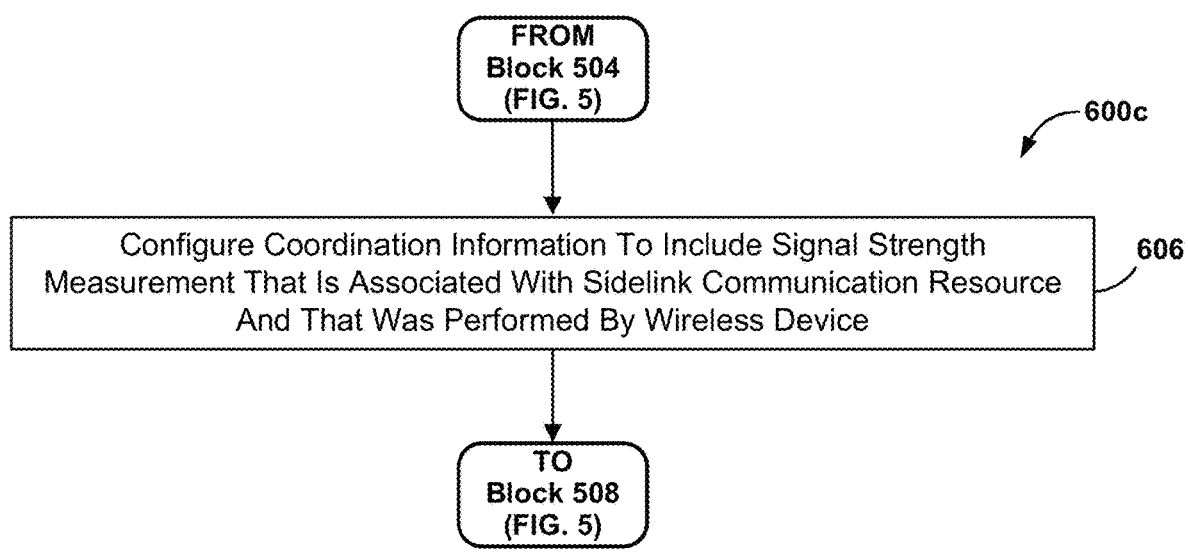

Referring to FIG. 6C, following the operations of block 504 (FIG. 5), the processor may configure the coordination information to include a signal strength measurement that is associated with the sidelink communication resource and that was performed by the wireless device in block 606. In some embodiments, the processor may configure the coordination information to include an indication of a range of signal strengths that comprises the signal strength measurement. For example, the coordination information may be configured to include a value or other indication that the second wireless device may use to determine the range of signal strengths. In some embodiments, the second wireless device may use the value or other indication to refer to a data structure, such as a lookup table, to determine the range of signal strengths. Means for performing functions of the operations in block 606 include the processor (e.g., 164, 210, 212, 214, 216, 218, 252, 260, 420).

The processor may then perform the operations of block 508 as described with reference to FIG. 5.

Figure 6D:
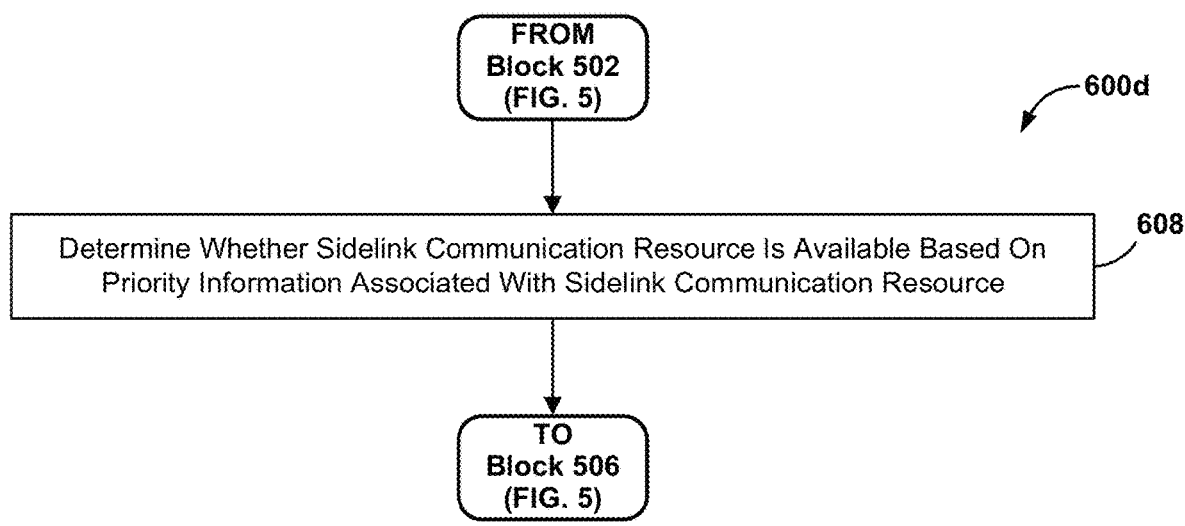

Referring to FIG. 6D, following the operations of block 502 (FIG. 5), the processor may determine whether the sidelink communication resource is available based on priority information associated with the sidelink communication resource in block 608. In some embodiments, the processor may compare the priority information associated with the sidelink communication resource to a communication resource priority threshold or another appropriate communication resource priority value. In some embodiments, the processor may determine that the sidelink communication resource is available if the priority information associated with the sidelink communication resource is below the communication resource priority threshold. Means for performing functions of the operations in block 608 may include the processor (e.g., 164, 210, 212, 214, 216, 218, 252, 260, 420).

In some embodiments, the processor may determine whether the sidelink communication resource is available based on priority information indicated by the second wireless device and associated with the sidelink communication resource. In some embodiments, the second wireless device may transmit the priority information in a message included in an SCI message (e.g., an SCI 2 message), a MAC-CE, or a PC5-RRC (radio resource control) message. In some embodiments, the priority information from the second wireless device may include a communication resource priority threshold or another appropriate communication resource priority value. In some embodiments, the processor may determine that the sidelink communication resource is available if the priority information associated with the sidelink communication resource is below the communication resource priority threshold indicated by the second wireless device.

The processor may then perform the operations of block 506 as described with reference to FIG. 5.

Figure 6E:
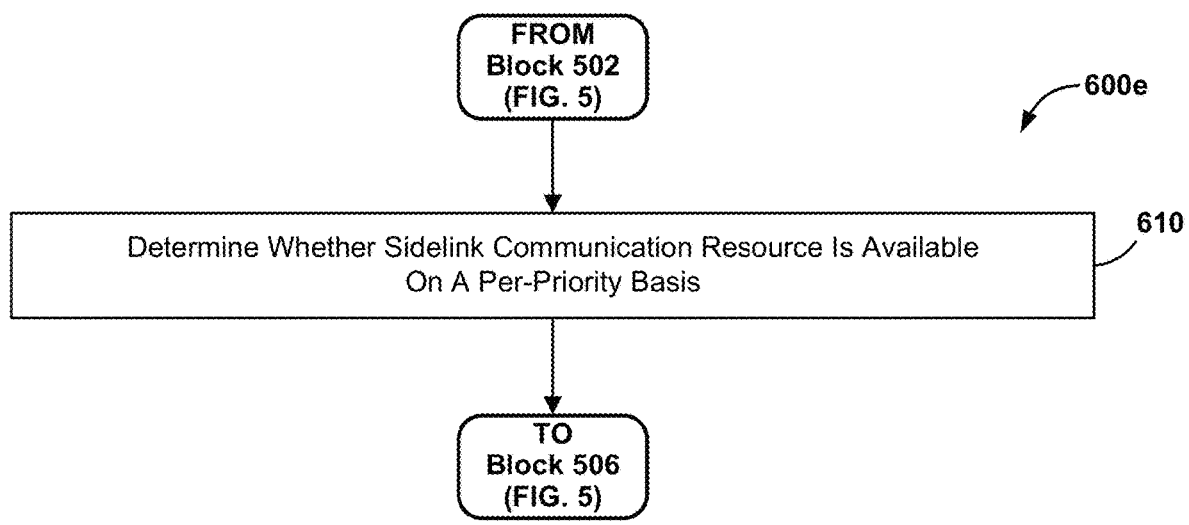

Referring to FIG. 6E, following the operations of block 502 (FIG. 5), the processor may determine whether the sidelink communication resource is available on a per-priority basis in block 610. In some embodiments, the processor may provide multiple resource availability indications for different priority indications, e.g., for each of eight levels of priority, which may be indicated by values such as 0-7. Means for performing functions of the operations in block 608 may include the processor (e.g., 164, 210, 212, 214, 216, 218, 252, 260, 420).

The processor may then perform the operations of block 506 as described with reference to FIG. 5.

Figure 6F:
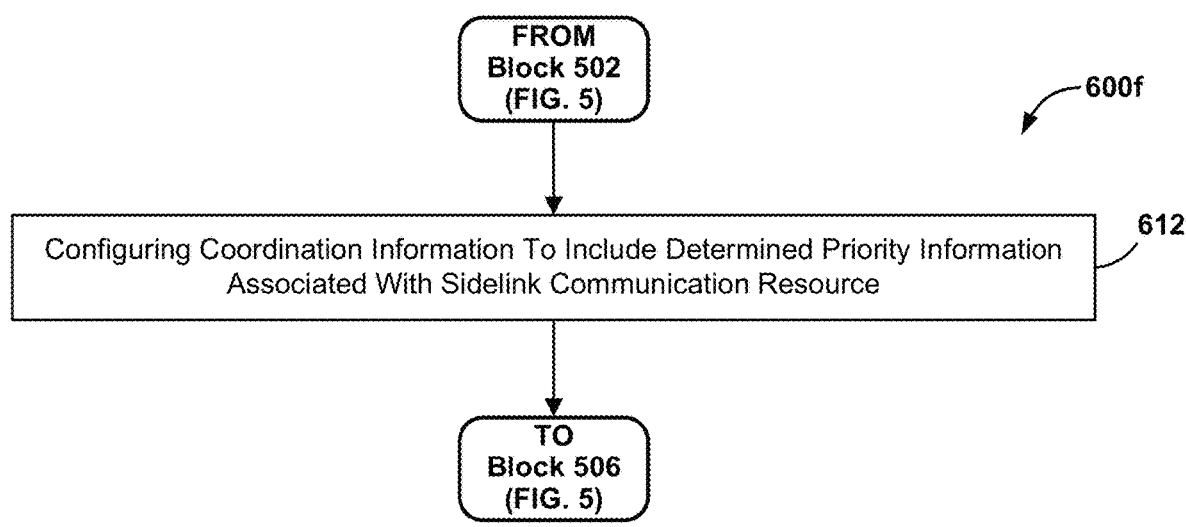

Referring to FIG. 6F, following the operations of block 502 (FIG. 5), the processor may configure the coordination information to include the determined priority information associated with the sidelink communication resource in block 612. In some embodiments, the processor may configure the coordination information to include an indication of the priority information. In some embodiments, the second wireless device may use the indication to refer to a data structure, such as a lookup table, to determine the priority information. In some embodiments, the second wireless device may use the indication to refer to a data structure, such as a lookup table, to determine the priority information. Means for performing functions of the operations in block 606 include the processor (e.g., 164, 210, 212, 214, 216, 218, 252, 260, 420).

The processor may then perform the operations of block 506 as described with reference to FIG. 5.

Figure 7:
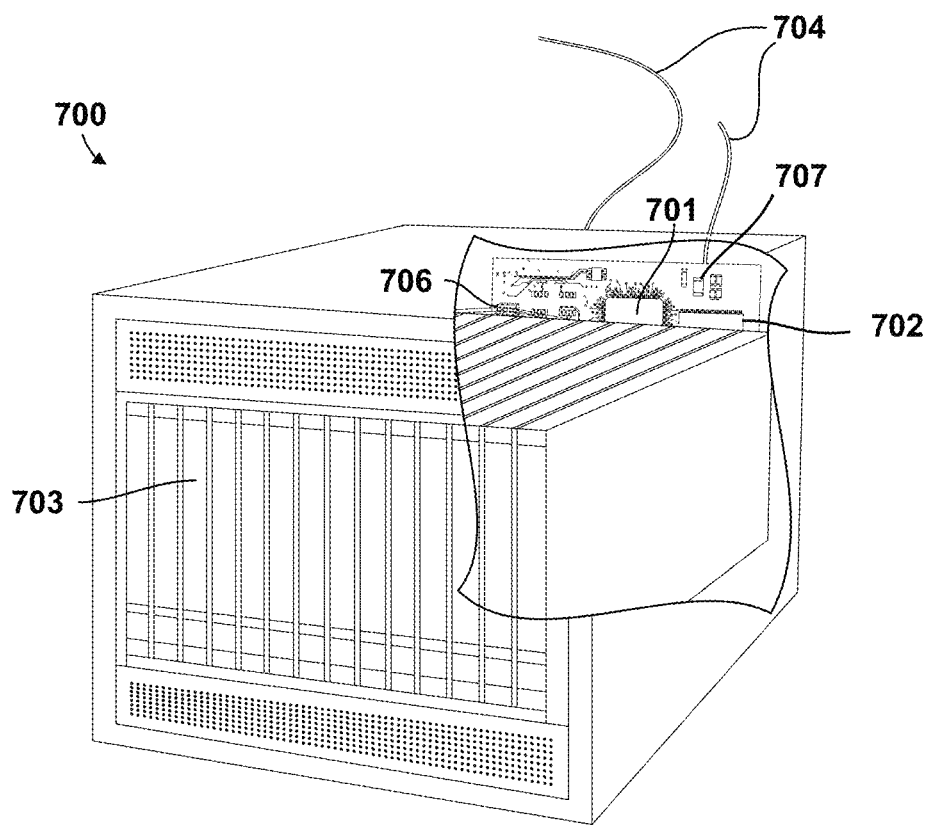
FIG. 7 is a component block diagram of a network computing device suitable for use with various embodiments.

Various embodiments may be implemented on a variety of wireless network devices, an example of which is illustrated in FIG. 7 in the form of a road side unit 700. Such network computing devices may include at least the components illustrated in FIG. 7. With reference to FIGS. 1-7, the road side unit 700 may typically include a processor 701 coupled to volatile memory 702 and a large capacity nonvolatile memory, such as a disk drive 703. The road side unit 700 may also include a peripheral memory access device such as a floppy disc drive, compact disc (CD) or digital video disc (DVD) drive 706 coupled to the processor 701. The road side unit 700 may also include network access ports 704 (or interfaces) coupled to the processor 701 for establishing data connections with a network, such as the Internet and/or a local area network coupled to other system computers and servers. The road side unit 700 may include one or more antennas 707 for transmitting and receiving electromagnetic radiation that may be connected to a wireless communication link. The road side unit 700 may include additional access ports, such as USB, Firewire, Thunderbolt, and the like for coupling to peripherals, external memory, or other devices.

Figure 8:
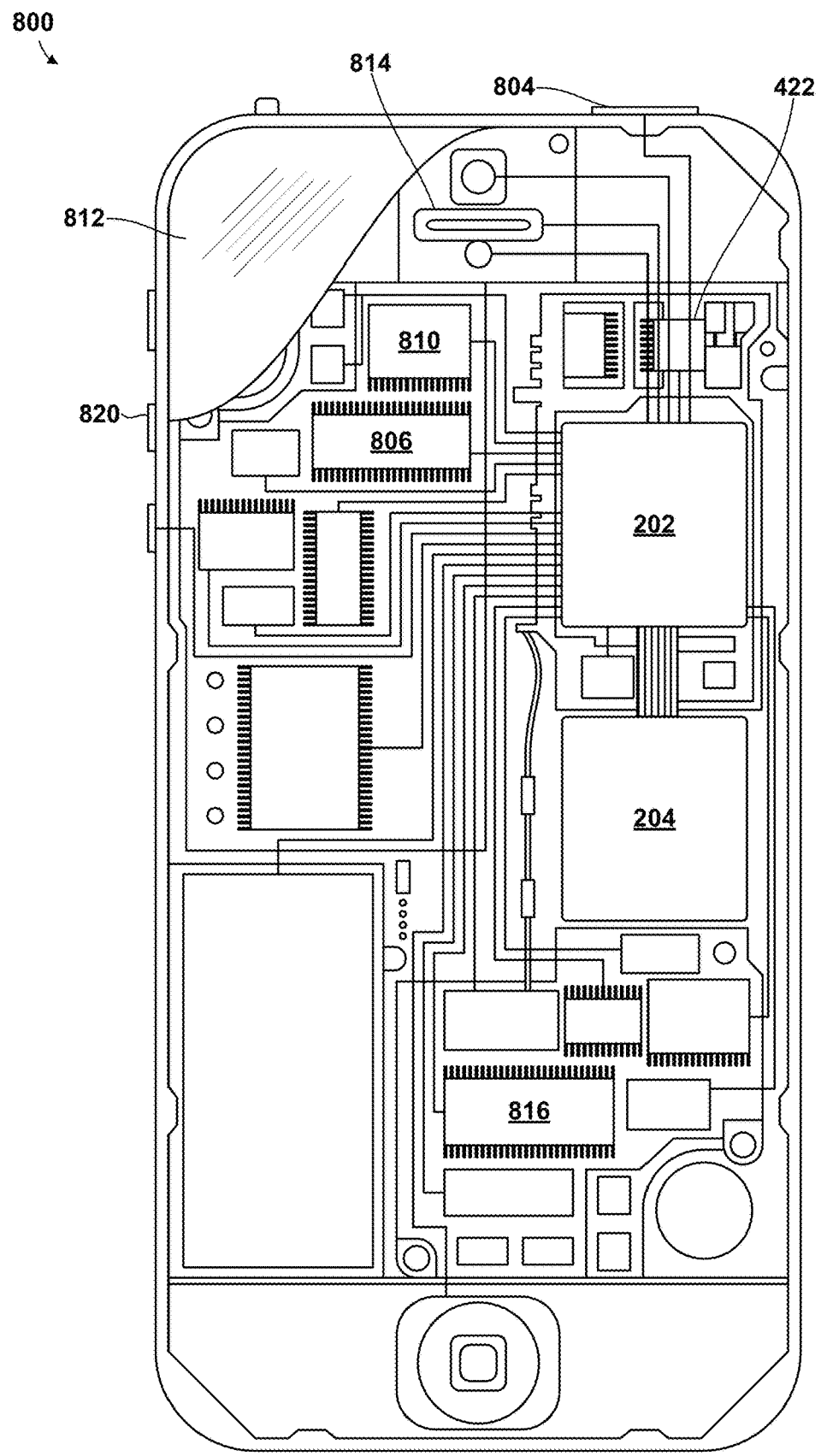
FIG. 8 is a component block diagram of a wireless device suitable for use with various embodiments.

Various embodiments may be implemented on a variety of wireless devices (e.g., the wireless device 120a-120f, 200, 320), an example of which is illustrated in FIG. 8 in the form of a smartphone 800. The smartphone 800 may include a first SOC 202 (e.g., a SOC-CPU) coupled to a second SOC 204 (e.g., a 5G capable SOC). The first and second SOCs 202, 204 may be coupled to internal memory 806, 816, a display 812, and to a speaker 814. Additionally, the smartphone 800 may include an antenna 804 for transmitting and receiving electromagnetic radiation that may be connected to a wireless data link and/or cellular telephone transceiver 422 coupled to one or more processors in the first and/or second SOCs 202, 204. Smartphones 800 typically also include menu selection buttons or rocker switches 820 for receiving user inputs.

A typical smartphone 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 422 and CODEC 810 may include a digital signal processor (DSP) circuit (not shown separately).

The processors of the road side unit 700 and the smart phone 800 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications may be stored in the memory 806, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and 600a-600f may be substituted for or combined with one or more operations of the methods 500 and 600a-600f.

Implementation examples are described in the following paragraphs. While some of the following implementation examples are described in terms of example methods, further example implementations may include: the example methods discussed in the following paragraphs implemented by a wireless device including a processor configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method of sidelink communications performed by a wireless device, including: determining signal strength information and priority information associated with a sidelink communication resource; determining coordination information based on the determined signal strength information and priority information; generating a message to include the determined coordination information; and transmitting the generated message including the determined coordination information to a second wireless device.

Example 2. The method of example 1, in which determining the coordination information based on the determined signal strength information and priority information includes determining whether the sidelink communication resource is available based on one or more signal strength thresholds.

Example 3. The method of example 2, including determining the one or more signal strength thresholds based on an indication received from the second wireless device.

Example 4. The method of example 2, including determining the one or more signal strength thresholds based on an associated index value received from the second wireless device, in which the one or more signal strength thresholds are configured or pre-configured on the wireless device.

Example 5. The method of any of examples 1-4, in which determining the coordination information based on the determined signal strength information and priority information includes configuring the coordination information to include a signal strength measurement that is associated with the sidelink communication resource and that was performed by the wireless device.

Example 6. The method of example 5, in which configuring the coordination information to include the signal strength measurement includes configuring the coordination information to include an indication of a range of signal strengths that comprises the signal strength measurement.

Example 7. The method of any of examples 1-6, in which determining the coordination information based on the determined signal strength information and priority information includes determining whether the sidelink communication resource is available based on priority information associated with the sidelink communication resource.

Example 8. The method of any of examples 1-7, in which determining whether the sidelink communication resource is available based on priority information associated with the sidelink communication resource includes determining whether the sidelink communication resource is available based on an indication of the priority information that is associated with the sidelink communication resource and is received from the second wireless device.

Example 9. The method of any of examples 1-8, in which determining the coordination information based on the determined signal strength information and priority information includes determining whether the sidelink communication resource is available on a per-priority basis.

Example 10. The method of any of examples 1-9, in which determining the coordination information based on the determined signal strength information and priority information includes configuring the coordination information to include the determined priority information associated with the sidelink communication resource.

Example 11. The method of any of examples 1-10, in which generating the message includes generating a medium access control control-element (MAC-CE).

Example 12. The method of any of examples 1-11, in which generating the message includes generating a sidelink control information message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of sidelink communications performed by a wireless device, comprising:
receiving, at the wireless device from another wireless device, an associated index value for determining one or more signal strength thresholds and a priority information indication;
generating a message including coordination information based on signal strength information determined from the one or more signal strength thresholds determined from the associated index value and also based on priority information determined from the received priority information indication, wherein the coordination information is configured to indicate to the other wireless device sidelink communication resources that are available for the other wireless device to transmit sidelink communication, wherein the coordination information includes multiple resource availability indications for different priority indications of different sidelink communication resources; and
transmitting the generated message including the coordination information to the other wireless device.

2. The method of claim 1, wherein determining the coordination information based on the determined signal strength information and priority information comprises determining whether the sidelink communication resources are available based on the one or more signal strength thresholds.

3. The method of claim 2, wherein the one or more signal strength thresholds are configured or pre-configured on the wireless device.

4. The method of claim 1, wherein determining the coordination information based on the determined signal strength information and priority information comprises configuring the coordination information to include a signal strength measurement that is associated with the sidelink communication resources and that was performed by the wireless device.

5. The method of claim 4, wherein configuring the coordination information to include the signal strength measurement comprises configuring the coordination information to include an indication of a range of signal strengths that comprises the signal strength measurement.

6. The method of claim 1, wherein determining the coordination information based on the determined signal strength information and priority information comprises determining whether the sidelink communication resources is available based on priority information associated with the sidelink communication resources.

7. The method of claim 6, wherein determining whether the sidelink communication resource is available based on priority information associated with the sidelink communication resource comprises determining whether the sidelink communication resource is available based on an indication of the priority information that is associated with the sidelink communication resource and is received from the other wireless device.

8. The method of claim 1, wherein determining the coordination information based on the determined signal strength information and priority information comprises configuring the coordination information to include the determined priority information associated with the sidelink communication resources.

9. The method of claim 1, wherein generating the message comprises generating a medium access control control-element (MAC-CE).

10. The method of claim 1, wherein generating the message comprises generating a sidelink control information message.

11. A wireless device, comprising:
a transceiver; and
a processor coupled to the transceiver and configured to:
receive, at the wireless device from another wireless device, an associated index value for determining one or more signal strength thresholds and a priority information indication;
generate a message including coordination information based on signal strength information determined from one or more signal strength thresholds determined from the associated index value and based on priority information determined from the received priority information indication, wherein the coordination information is configured to indicate to the other wireless device sidelink communication resources that are available for the other wireless device to transmit sidelink communication, wherein the coordination information includes multiple resource availability indications for different priority indications of different sidelink communication resources; and transmit the generated message including the coordination information to the other wireless device.

12. The wireless device of claim 11, wherein the processor is further configured to determine whether the sidelink communication resources are available based on the one or more signal strength thresholds.

13. The wireless device of claim 12, wherein the processor is further configured such that the one or more signal strength thresholds are configured or pre-configured on the wireless device.

14. The wireless device of claim 11, wherein the processor is further configured to configure the coordination information to include a signal strength measurement that is associated with the sidelink communication resources and that was performed by the wireless device.

15. The wireless device of claim 14, wherein the processor is further configured to configure the coordination information to include an indication of a range of signal strengths that comprises the signal strength measurement.

16. The wireless device of claim 11, wherein the processor is further configured to determine whether the sidelink communication resources is available based on priority information associated with the sidelink communication resources.

17. The wireless device of claim 11, wherein the processor is further configured to determine whether the sidelink communication resource is available based on an indication of the priority information that is associated with the sidelink communication resource and is received from the other wireless device.

18. The wireless device of claim 11, wherein the processor is further configured to configure the coordination information to include the determined priority information associated with the sidelink communication resources.

19. The wireless device of claim 11, wherein the processor is further configured to generate a medium access control control-element (MAC-CE).

20. The wireless device of claim 11, wherein the processor is further configured to generate a sidelink control information message.

21. A wireless device, comprising:
means for receiving, at the wireless device from another wireless device, an associated index value for determining one or more signal strength thresholds and a priority information indication;
means for generating a message including coordination information based on signal strength information determined from one or more signal strength thresholds determined from the associated index value and based on priority information determined from the received priority information indication, wherein the coordination information is configured to indicate to the other wireless device sidelink communication resources that are available for the other wireless device to transmit sidelink communication, wherein the coordination information includes multiple resource availability indications for different priority indications of different sidelink communication resources; and
means for transmitting the generated message including the coordination information to the other wireless device.

22. The wireless device of claim 21, wherein means for determining the coordination information based on the determined signal strength information and priority information comprises means for determining whether the sidelink communication resources are available based on the one or more signal strength thresholds.

23. The wireless device of claim 22, wherein the one or more signal strength thresholds are configured or pre-configured on the wireless device.

24. The wireless device of claim 21, wherein means for determining the coordination information based on the determined signal strength information and priority information comprises means for configuring the coordination information to include a signal strength measurement that is associated with the sidelink communication resources and that was performed by the wireless device.

25. A non-transitory processor-readable medium having stored thereon processor-executable instruction configured to cause a processing device in a wireless device to:
receive, at the wireless device from another wireless device, an associated index value for determining one or more signal strength thresholds and a priority information indication;
generate a message including coordination information based on signal strength information determined from one or more signal strength thresholds determined from the associated index value and also based on priority information determined from the received priority information indication, wherein the coordination information is configured to indicate to the other wireless device sidelink communication resources that are available for the other wireless device to transmit sidelink communication, wherein the coordination information includes multiple resource availability indications for different priority indications of different sidelink communication resource; and
transmit the generated message including the coordination information to the other wireless device.

* * * * *